(12) United States Patent
Phan et al.

(10) Patent No.: US 9,165,490 B2
(45) Date of Patent: *Oct. 20, 2015

(54) 3D/2D MULTI-PRIMARY COLOR IMAGE DEVICE AND METHOD FOR CONTROLLING THE SAME

(71) Applicant: VP ASSETS LIMITED, Hong Kong (CN)

(72) Inventors: Gia Chuong Phan, Hong Kong (CN); Hon Wah Wong, Hong Kong (CN)

(73) Assignee: VP ASSETS LIMITED, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 14/181,173

(22) Filed: Feb. 14, 2014

(65) Prior Publication Data

US 2014/0160147 A1 Jun. 12, 2014

Related U.S. Application Data

(63) Continuation-in-part of application No. 12/852,062, filed on Aug. 6, 2010, now Pat. No. 8,654,144.

(51) Int. Cl.
| | |
|---|---|
| G09G 5/00 | (2006.01) |
| G09G 3/00 | (2006.01) |
| G09G 3/20 | (2006.01) |
| H04N 13/04 | (2006.01) |

(52) U.S. Cl.
CPC .............. *G09G 3/003* (2013.01); *G09G 3/2003* (2013.01); *H04N 13/0422* (2013.01); *H04N 13/0452* (2013.01); *H04N 13/0456* (2013.01); *G09G 2340/06* (2013.01); *H04N 13/0404* (2013.01); *H04N 13/0409* (2013.01)

(58) Field of Classification Search
None
See application file for complete search history.

(56) References Cited

U.S. PATENT DOCUMENTS

| | | | |
|---|---|---|---|
| 4,879,603 A | 11/1989 | Berman | |
| 5,500,765 A | 3/1996 | Eichenlaub | |
| 5,825,541 A | 10/1998 | Imai | |
| 5,982,342 A | 11/1999 | Iwata et al. | |
| 6,005,645 A | 12/1999 | Hirakata et al. | |
| 6,049,424 A | 4/2000 | Hamagishi | |
| 6,157,242 A | 12/2000 | Fukui | |
| 6,157,424 A | 12/2000 | Eichenlaub | |
| 6,661,429 B1 | 12/2003 | Phan | |
| 6,753,858 B2 | 6/2004 | Asai et al. | |
| 7,050,020 B2 | 5/2006 | Uehara et al. | |
| 7,091,986 B2 | 8/2006 | Phan | |
| 7,215,347 B2 | 5/2007 | Phan | |
| 7,286,136 B2 | 10/2007 | Phan | |
| 7,660,038 B2 | 2/2010 | Uehara et al. | |
| 7,742,205 B2 | 6/2010 | Lor et al. | |

(Continued)

FOREIGN PATENT DOCUMENTS

| | | | |
|---|---|---|---|
| TW | 200627364 A | 12/1994 | |
| TW | M357682 A | 10/1997 | |

*Primary Examiner* — Kee Tung
*Assistant Examiner* — Leon T Cain, II
(74) *Attorney, Agent, or Firm* — Birch, Stewart, Kolasch & Birch, LLP

(57) ABSTRACT

A 3D/2D multi-primary color image device is provided with an optical unit to direct a first image to a first group of viewers and a second image to a second group of viewers. Each color dot of the multi-primary color image device comprises at least two color sections controlled independently. A first group of viewers and a second group of viewers can view simultaneously and respectively a first image and a second image.

21 Claims, 15 Drawing Sheets

(56) References Cited

U.S. PATENT DOCUMENTS

| | | |
|---|---|---|
| 8,325,223 B2 | 12/2012 | Ko et al. |
| 8,466,954 B2 | 6/2013 | Ko et al. |
| 8,654,144 B2 * | 2/2014 | Phan et al. .................. 345/613 |
| 2003/0067539 A1 | 4/2003 | Doerfel et al. |
| 2004/0240777 A1 | 12/2004 | Woodgate et al. |
| 2007/0086090 A1 | 4/2007 | Wang et al. |
| 2010/0073768 A1 | 3/2010 | Kim et al. |
| 2010/0118045 A1 | 5/2010 | Brown Elliott et al. |
| 2010/0177093 A1 | 7/2010 | Uehara et al. |

* cited by examiner

3D/2D MULTI-PRIMARY COLOR IMAGE DEVICE AND METHOD FOR CONTROLLING THE SAME

CROSS-REFERENCE TO RELATED APPLICATION

The present application is a Continuation-in-Part of U.S. patent application Ser. No. 12/852,062, filed on Aug. 6, 2010, the entire contents of which are hereby incorporated by reference and for which priority is claimed under 35 U.S.C. §120.

BACKGROUND OF THE INVENTION

1. Field of the Invention

The invention relates to an image device, and particularly to a three-dimensional (3D)/two-dimensional (2D) multi-primary color image device which can display a 3D image, a 2D image and a mixed 2D/3D image, and a method for controlling the same.

2. Description of the Related Art

Display devices capable of displaying 3D images have been developed. 3D image display systems that have been studied so far can be classified into a type which uses glasses and a type which is glass free. Wearing glasses may have negative impact on users watching 3D contents. The more user friendly glass free 3D image display device includes an optical unit such as a parallax barrier, a lenticular lens or a second LCD which is used to direct two slightly different images, one to the left eye and one to the right eye for forming a 3D image.

Recently have active studies also been made to permit a 3D image display device to display a 2D image. The conventional approach is to make the aforementioned images for the left eye and for the right eye match with each other and display the same image. Referring to FIG. 1, it shows a conventional 3D display device. The conventional 3D display device 10 includes a plurality of RGB pixel groups 11 for the left eye and a plurality of RGB pixel groups 12 for the right eye. For example, the RGB pixel group 11 includes a red dot (R1) 111, a green dot (G1) 112 and a blue dot (B1) 113 for the left eye, and the RGB pixel group 12 includes a red dot (R2) 121, a green dot (G2) 122 and a blue dot (B2) 123 for the right eye. In this case, the same information should be displayed over two pixels, thus reducing the resolution to a half.

U.S. Pat. No. 7,705,844 teaches a method to arrange two RGB pixels in a square instead of 1 RGB stripe pixel so that double density can be obtain in the horizontal direction, thus compensating the loss of resolution by dividing a left image and a right image. The downside is that the gate line number increases by three, thus reducing dramatically the pixel clock and TFT LCD pixels do not have enough time to be fully charged, specially for amorphous LCD display.

U.S. Pat. No. 7,050,020 teaches a method to use 2 lenticular lenses to maintain the full resolution in 2D display mode in shifting one lenticular lens against another lenticular lens by half a lens pitch. The problem is still the complicated construction of the display with moving lenticular lenses, besides higher cost and easy wear and tear.

U.S. Pat. No. 8,466,954 teaches a display which alternately presents images from at least two video feeds and in which a synchronized, shuttered filter device is used that only permits the viewing of images from one of the video feeds. It is a time-sharing arrangement to allow multiple viewers to view different images on the same display. The downside is that the frame rate is reduced and so the visual quality of the display is degraded.

SUMMARY OF THE INVENTION

The present invention is to provide an image device. The image device includes a plurality of pixel groups. Each pixel group includes a plurality of dots arranged in a predetermined identical matrix form, and each pixel group has at least one first color dot, at least one second color dot, at least one third color dot and at least one fourth color dot. The first color dot comprises at least two first color sections controlled independently, the second color dot comprises at least two second color sections controlled independently, the third color dot comprises at least two third color sections controlled independently, and the fourth color dot comprises at least two fourth color sections controlled independently.

The present invention is to provide a method for controlling the above image device. The method of the invention comprises the steps of: (a) first sub-pixel rendering and color space converting input data for a first image in a first color space, and outputting multi-primary color section signals for the first image in the second color space; and (b) second sub-pixel rendering and color space converting the input data for a second image in the first color space and outputting multi-primary color section signals for the second image in the second color space.

It is an object of the invention to provide a thin, simple and low-cost 3D image/2D image display device which ensures seamless switching between the display of a 3D image, the display of a 2D image and the display of a mixed 2D/3D image with full resolution and high brightness.

It is another object of the invention to provide a multi-primary color image device such as RGBW using virtual pixel of one single color to represent a full RGB color pixel by means of sub-pixel rendering and color space conversion.

It is another object of the invention to display multiple images simultaneously to multiple groups of viewers.

BRIEF DESCRIPTION OF THE DRAWING

Further advantageous measures are described in the dependent claims. The invention is shown in the attached drawing and is described hereinafter in greater detail.one group of viewers

DETAILED DESCRIPTION OF THE INVENTION

Figure 2:
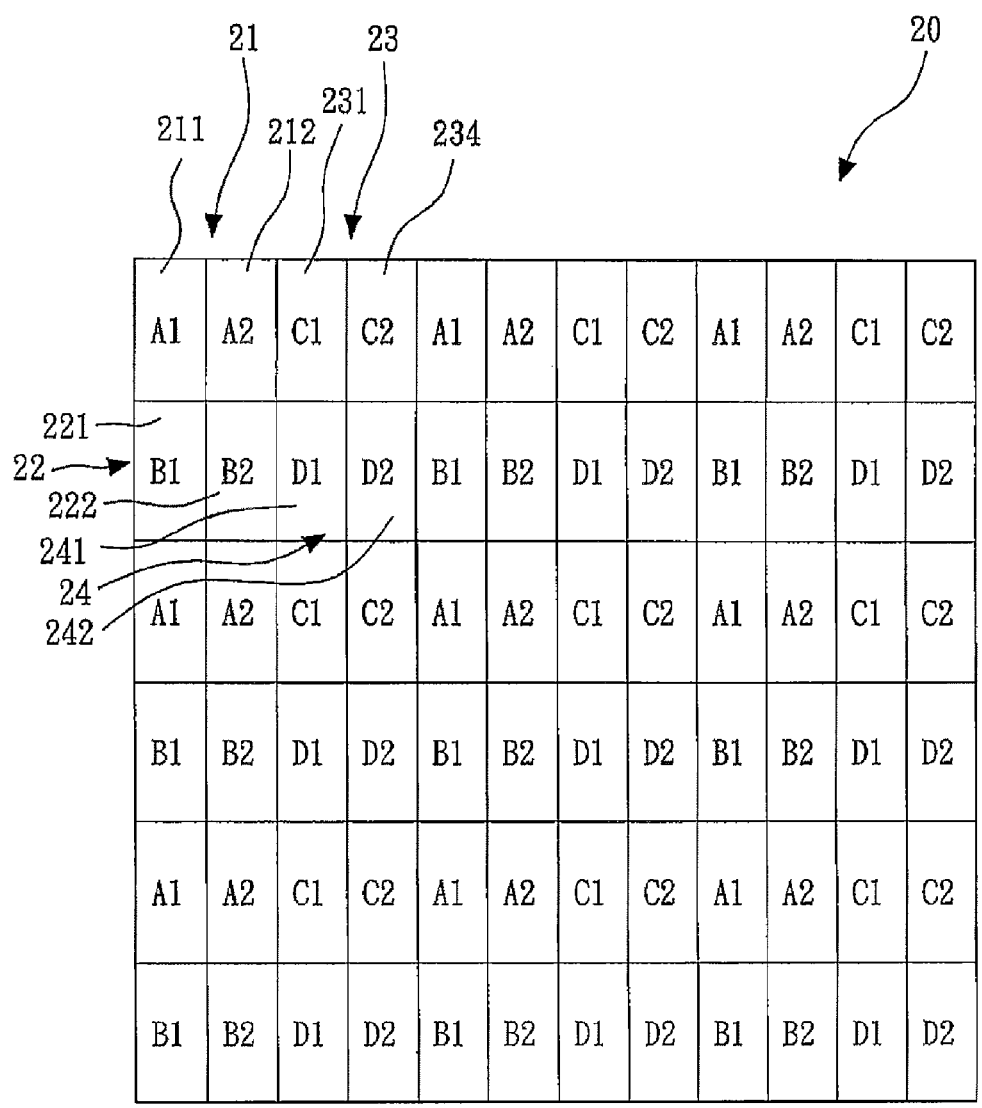
FIG. 2 shows the image device according to a first embodiment of the invention.

Referring to FIG. 2, it shows the image device according to a first embodiment of the invention. The image device 20 includes a plurality of pixel groups. Each pixel group includes a plurality of dots 21, 22, 23, 24 arranged in a predetermined identical matrix form, and each pixel group has at least one first color dot 21, at least one second color dot 22, at least one third color dot 23 and at least one fourth color dot 24. The first color dot 21 comprises at least two first color sections 211 (A1), 212 (A2) controlled independently, the second color dot 22 comprises at least two second color sections 221 (B1), 222 (B2) controlled independently, the third color dot 23 comprises at least two third color sections 231 (C1), 232 (C2) controlled independently, and the fourth color dot 24 comprises at least two fourth color sections 241 (D1), 242 (D2) controlled independently.

The image device 20 can display a 3D image, a 2D image and a mixed 2D/3D image. The image device 20 can further comprising an optical unit disposed at one side of the image device and having view-separation elements arranged in the first direction into multiple rows and columns. The optical unit used in the invention can be, but is not limited to, a liquid crystal shutter, a lenticular lens or a parallax barrier.

Figure 3A:
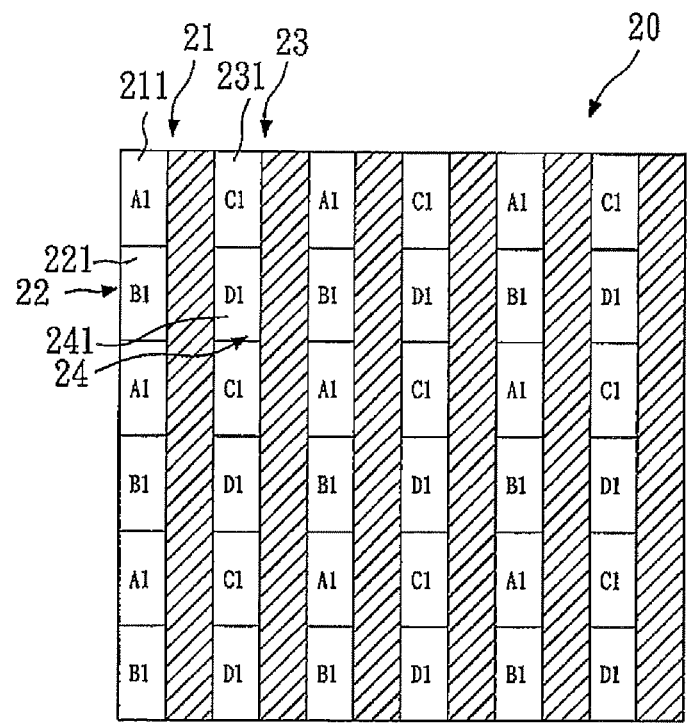
FIGS. 3A and 3B show one section of a color dot is for displaying a first image while another section of the same color dot is for displaying a second image according to the first embodiment of the invention.
Figure 3B:
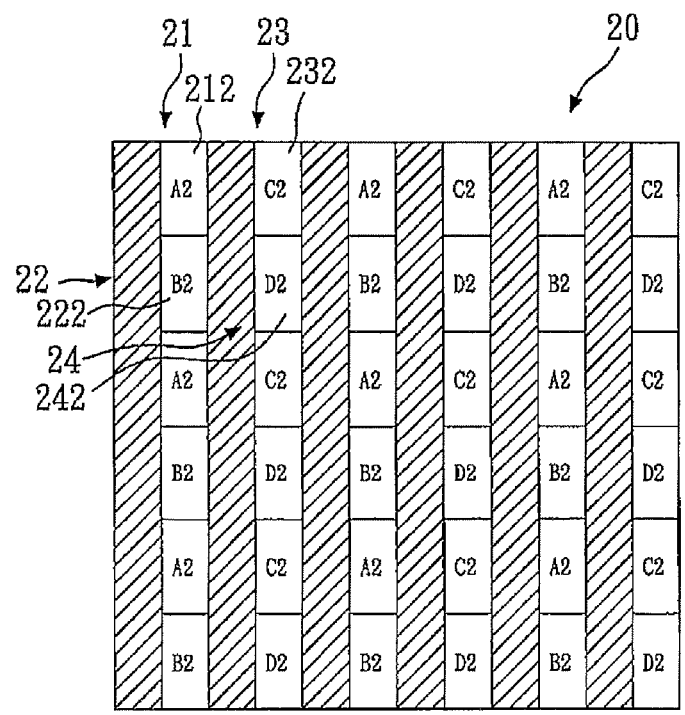

FIGS. 3A and 3B show one section of a color dot is for displaying a first image while another section of the same color dot is for displaying a second image according to the first embodiment of the invention. In FIG. 3A, one section 211(A1), 221 (B1), 231 (C1) 241 (D1) of a color dot 21, 22, 23, 24 is for displaying a first image. In FIG. 3B, another section 212(A2), 222 (B2), 232 (C2) 242 (D2) of the same color dot 21, 22, 23, 24 is for displaying a second image. In this embodiment, the data inputted to the one section 211 (A1), 221 (B1), 231 (C1) 241 (D1) of a color dot 21, 22, 23, 24 is multi-primary color section signals for one group of viewers, and the data inputted to another section 212(A2), 222 (B2), 232 (C2) 242 (D2) of a color dot 21, 22, 23, 24 is multi-primary color section signals for another group of viewers.

Referring to FIGS. 3A and 3B again, the first and second images may be from any video content, multimedia stream, computer output, game output, electronic device, or form any known means for sourcing video images. Further, the first and second images may be 2D and/or 3D.

Figure 8:
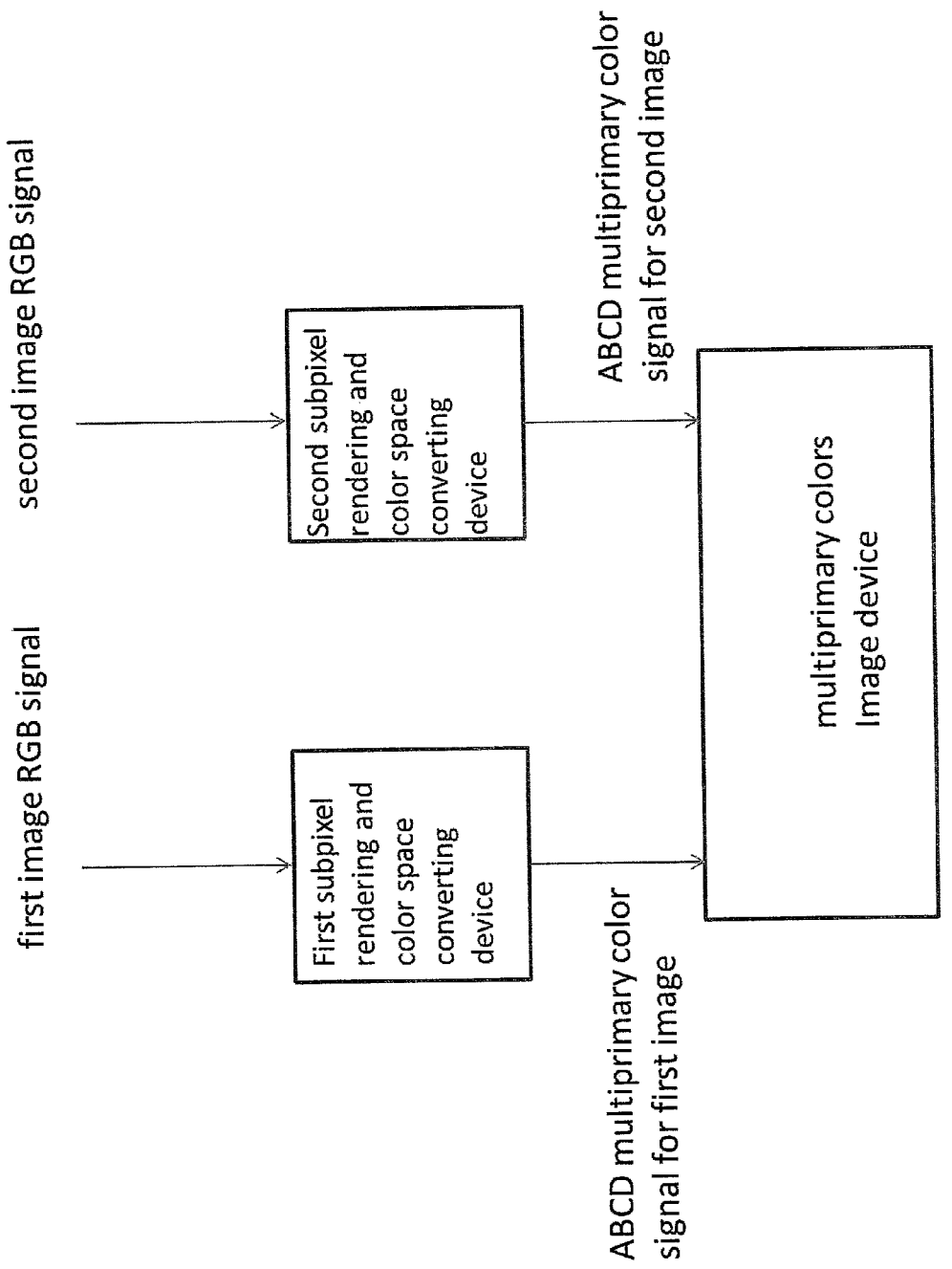
FIG. 8 shows a block diagram for illustrating the method for controlling the image device according to the invention.

FIG. 8 shows a block diagram for illustrating the method for controlling the image device according to the invention.

Referring to FIGS. 2, 3A, 3B and 8, the image device 20 further comprises a first sub-pixel rendering and color space converting device for receiving the input data for a first image in a first color space and outputting multi-primary color section signals for the first image in a second color space (FIG. 3A), and further comprises a second sub-pixel rendering and color space converting device for receiving the input data for a second image in the first color space and outputting multi-primary color section signals for the second image in the second color space (FIG. 3B). For example, the first color space is RGB color space, and the second color space is ABCD color space (FIG. 2).

In this embodiment, each color dot represents a luminance and a chrominance of a corresponding full color pixel data by grouping with neighboring dots to form a plurality of overlapping full color dynamics pixel groups. That is, a multi-primary color image device such as RGBW using virtual pixel of one single color to represent a full RGB color pixel by means of sub-pixel rendering and color space conversion. Compared with FIG. 1 and FIG. 2, for example the resolution of the conventional RGB 3D display device is 1920×3×1080, the resolution of the image device 20 of the invention is 1920×2×1080. For 3D image, the resolution of the conventional RGB 3D display device for the first image is 960×3×1080, and the resolution of the conventional RGB 3D display device for the second image is 960×3×1080; the resolution of the image device of the invention for the first image is 1920×1×1080, and the resolution of the image device 20 of the invention for the second image is 1920×1×1080. For 2D image, the resolution of the conventional RGB 3D display device is 1920×3×1080, the resolution of the image device 20 of the invention is 1920×2×1080. Therefore, the image device 20 of the invention can display a 2D image with additional one bit color depth by using the 2 sections of the same color dot. The image device 20 of the invention can provide a thin, simple and low-cost 3D image/2D image display device which ensures seamless switching between the display of a 3D image, the display of a 2D image and the display of a mixed 2D/3D image with full resolution and high brightness.

FIG. 2 illustrates a first orientation of image device 20 with respect to a viewer of the image display. Referring to FIG. 2, at least two first color sections 211, 212 of image device 20 are arranged in a first direction, at least two second color sections 221, 222 are arranged in the first direction, at least two third color sections 231, 232 are arranged in the first direction, and at least two fourth color sections 241, 242 are arranged in the first direction. As can be seen in FIG. 2, the first direction is a horizontal direction (row direction), and one of the at least two first color sections 212 is located directly between another of the at least two first color sections 211 and one of the at least two third color sections 231 in the row direction. On the other hand, if the image device 20 is rotated from the first orientation (shown in FIG. 2) by ninety degrees)(90° about an axis perpendicular to the face of image display 20, the image display 20 would be in a second orientation with respect to a viewer, the at least two first color sections 211, 212 of the image display 20 are arranged in a second direction, the at least two second color sections 221, 222 are arranged in the second direction, the at least two third color sections 231, 232 are arranged in the second direction, and the at least two fourth color sections 241, 242 are arranged in the second direction. The second direction is a vertical direction (column direction), and one of the at least two first color sections 212 is located directly between another of the at least two first color sections 211 and one of the at least two third color sections 231 in the column direction.

Figure 9:
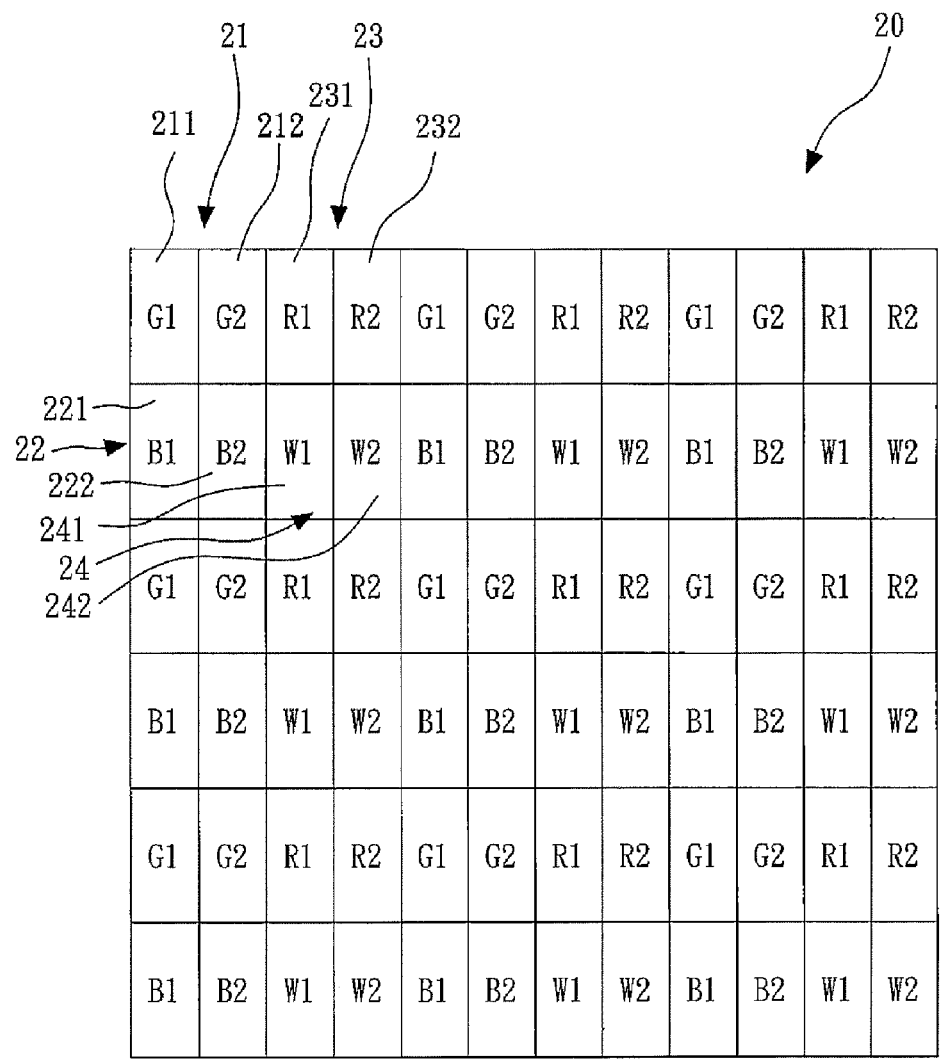
FIG. 9 shows the RGBW image device according to the first embodiment of the invention.
Figure 10A:
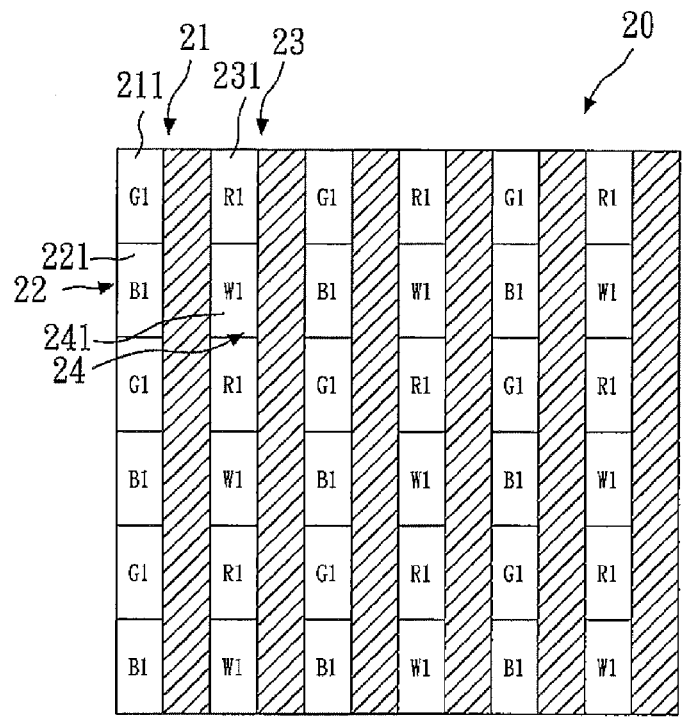
FIGS. 10A and 10B show one section of a color dot is for displaying a first image while another section of the same color dot is for displaying a second image according to the first embodiment of the invention.
Figure 10B:
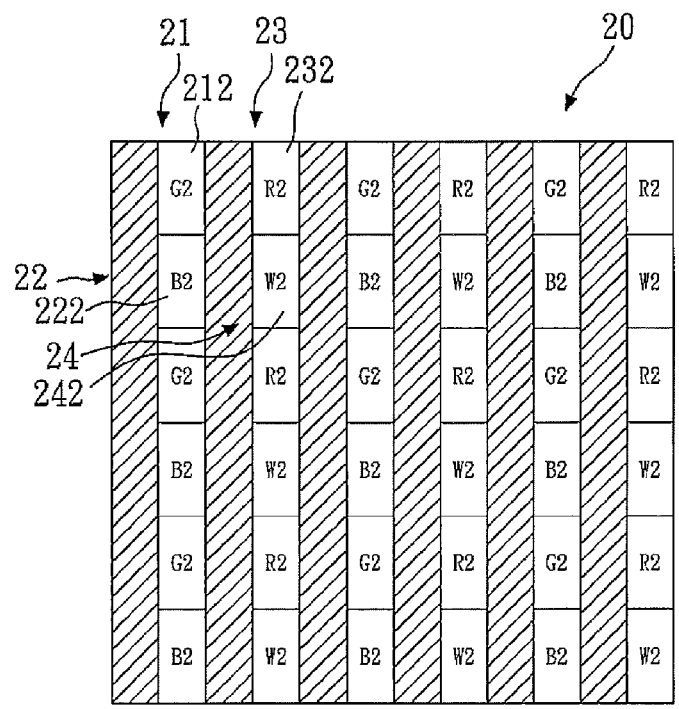

Referring to FIG. 2 again, the second color dot 22 and the third color dot 23 have lower light intensity than the first color dot 21 and the fourth color dot 24 in a white balance status, the first color dot 21 and the fourth color dot 24 are disposed on diagonal positions of the predetermined identical matrix of the pixel group. Referring to FIGS. 9, 10A and 10B, in this embodiment, the first color dot 21 is a green dot, the second color dot 22 is a blue dot, the third color dot 23 is a red dot and the fourth color dot 24 is a white dot. Further, the first color dot 21, the second color dot 22, the third color dot 23 and the fourth color dot 24 are quadrate shape.

Figure 4:
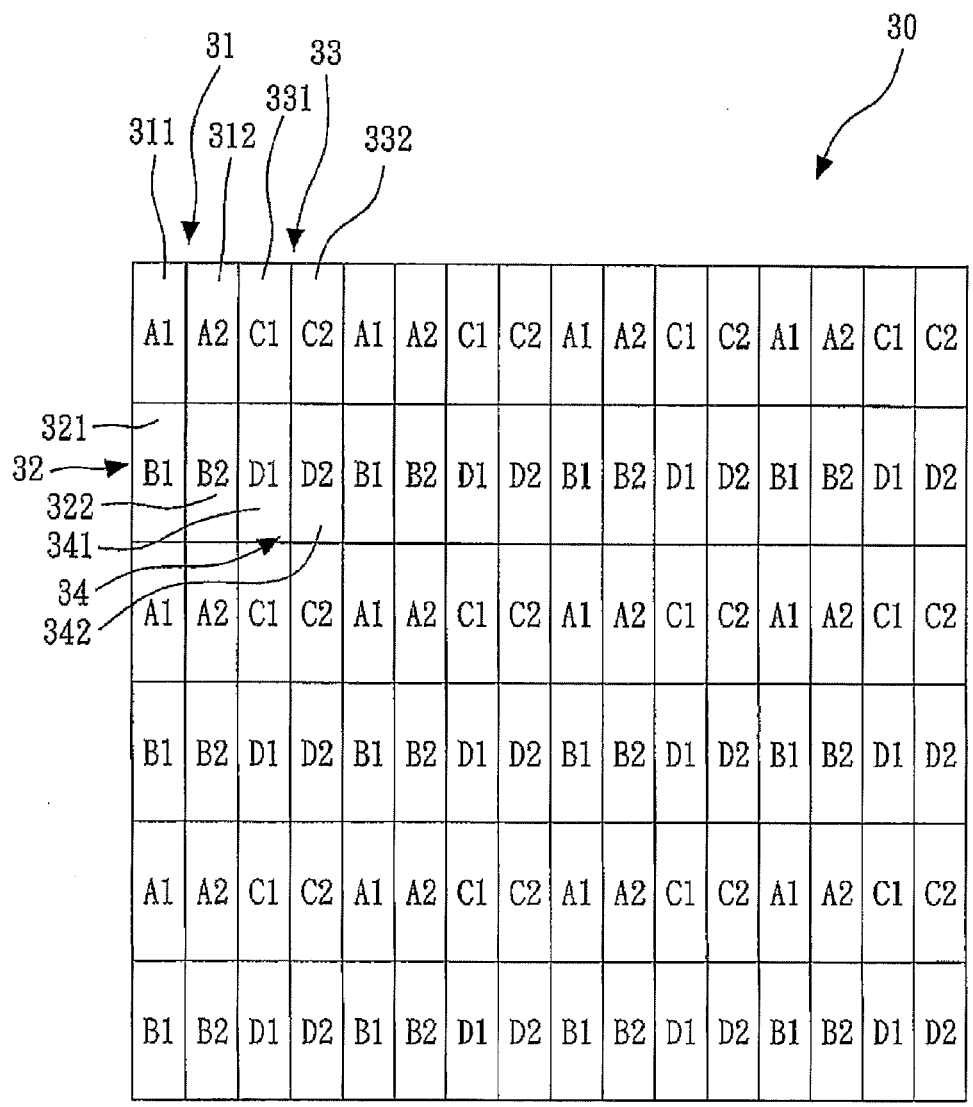
FIG. 4 shows the image device according to a second embodiment of the invention.

Referring to FIG. 4, it shows the image device according to a second embodiment of the invention. The image device 30 includes a plurality of pixel groups. Each pixel group includes a plurality of dots 31, 32, 33, 34 arranged in a predetermined identical matrix form, and each pixel group has at least one first color dot 31, at least one second color dot 32, at least one third color dot 33 and at least one fourth color dot 34. The first color dot 31 comprises at least two first color sections 311 (A1), 312 (A2) controlled independently, the second color dot 32 comprises at least two second color sections 321 (B1), 322 (B2) controlled independently, the third color dot 33 comprises at least two third color sections 331 (C1), 332 (C2) controlled independently, and the fourth color dot 34 comprises at least two fourth color sections 341 (D1), 342 (D2) controlled independently.

Figure 5A:
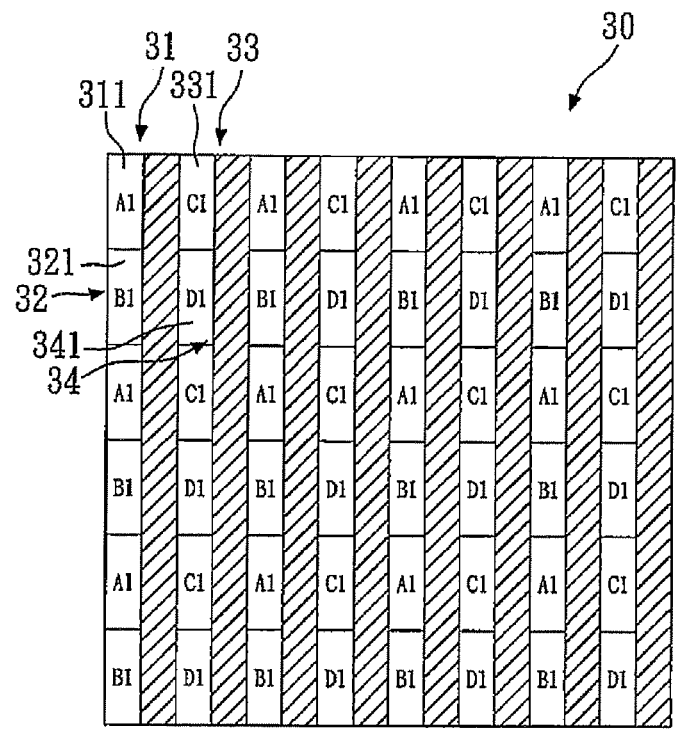
FIGS. 5A and 5B show one section of a color dot is for displaying a first image while another section of the same color dot is for displaying a second image according to the second embodiment of the invention.
Figure 5B:
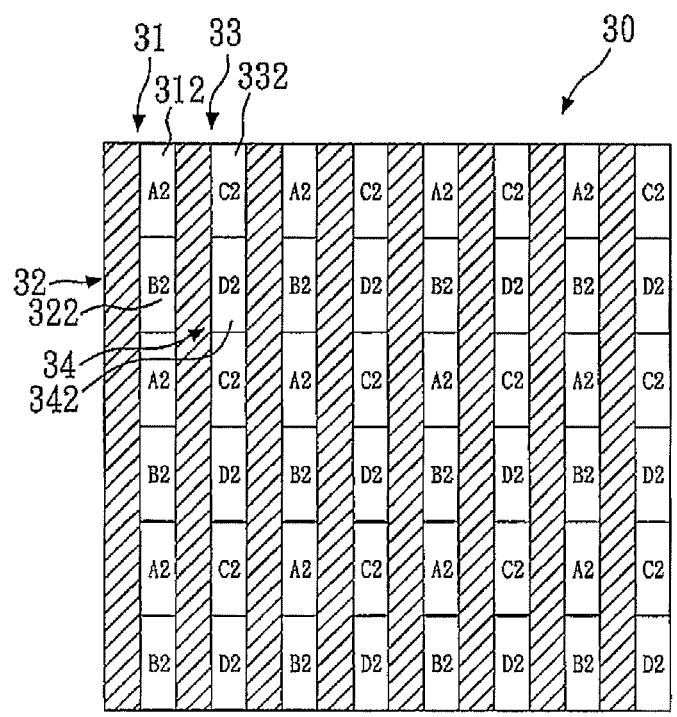

FIGS. 5A and 5B show one section of a color dot is for displaying a first image while another section of the same color dot is for displaying a second image according to the second embodiment of the invention. In FIG. 5A, one section 311(A1), 321 (B1), 331 (C1) 341 (D1) of a color dot 31, 32, 33, 34 is for displaying a first image. In FIG. 5B, another section 312(A2), 322 (B2), 332 (C2) 342 (D2) of the same color dot 31, 32, 33, 34 is for displaying a second image.

Referring to FIGS. 5A and 5B again, the first and second images may be from any video content, multimedia stream, computer output, game output, electronic device, or form any known means for sourcing video images. Further, the first and second images may be 2D and/or 3D.

Figure 1:
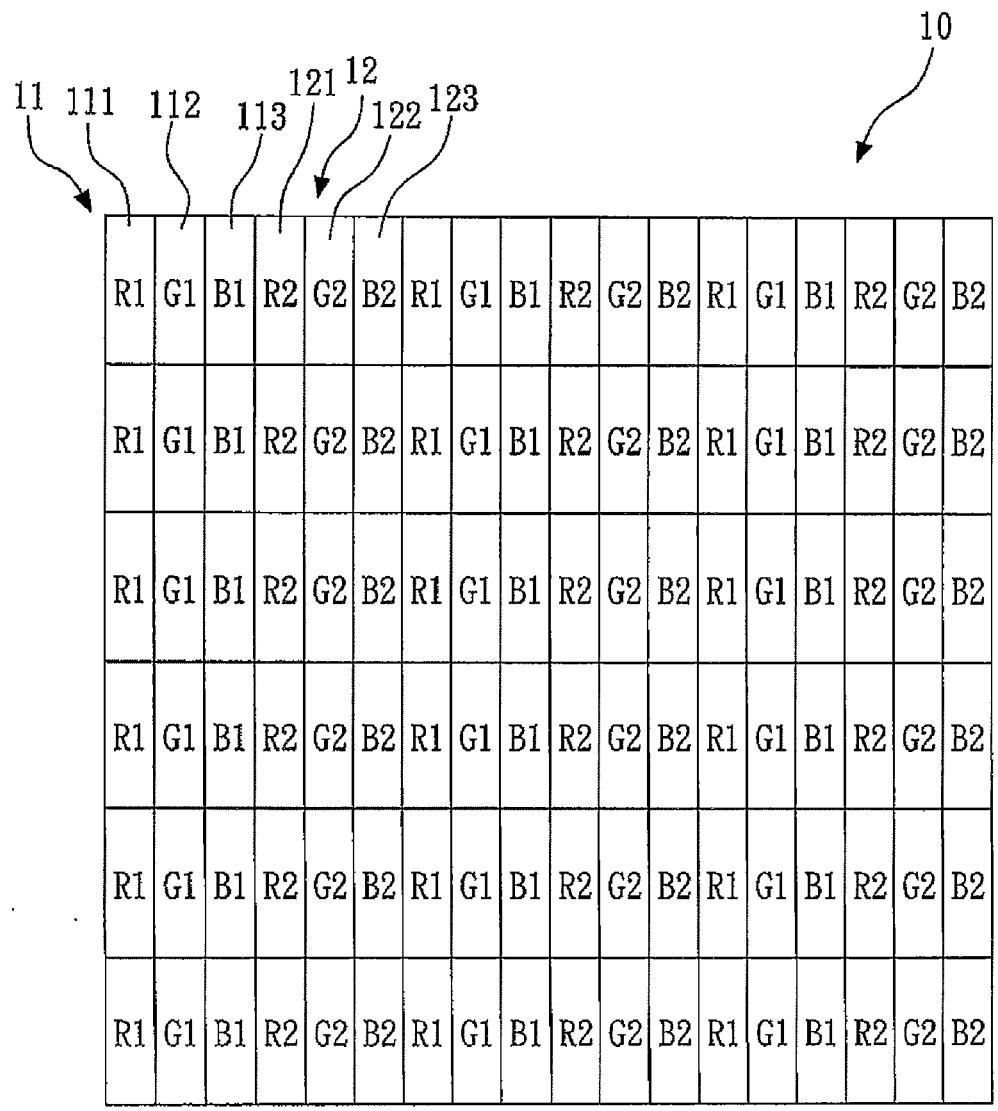
FIG. 1 shows a conventional 3D display device.

Compared with FIG. 1 and FIG. 4, for example the resolution of the conventional RGB 3D display device is 1920×3×1080, the resolution of the image device 30 of the invention is 2880×2×1080, thus only color filter is changed for adopting multi primary color structure without modifying other components of a conventional RGB display for cost reasons. For 3D image, the resolution of the conventional RGB 3D display device for the first image is 960×3×1080, and the resolution of the conventional RGB 3D display device for the second image is 960×3×1080; the resolution of the image device 30 of the invention for the first image is 2880×1×1080, and the resolution of the image device of the invention for the second image is 2880×1×1080. For 2D image, the resolution of the conventional RGB 3D display device is 1920×3×1080, the resolution of the image device of the invention is 2880×2×1080. Therefore, the image device of the invention can display a 2D image with additional one bit color depth by using the 2 sections of the same color dot. The image device of the invention can provide a thin, simple and low-cost 3D image/2D image display device which ensures seamless switching between the display of a 3D image, the display of a 2D image and the display of a mixed 2D/3D image with full resolution and high brightness.

Figure 11:
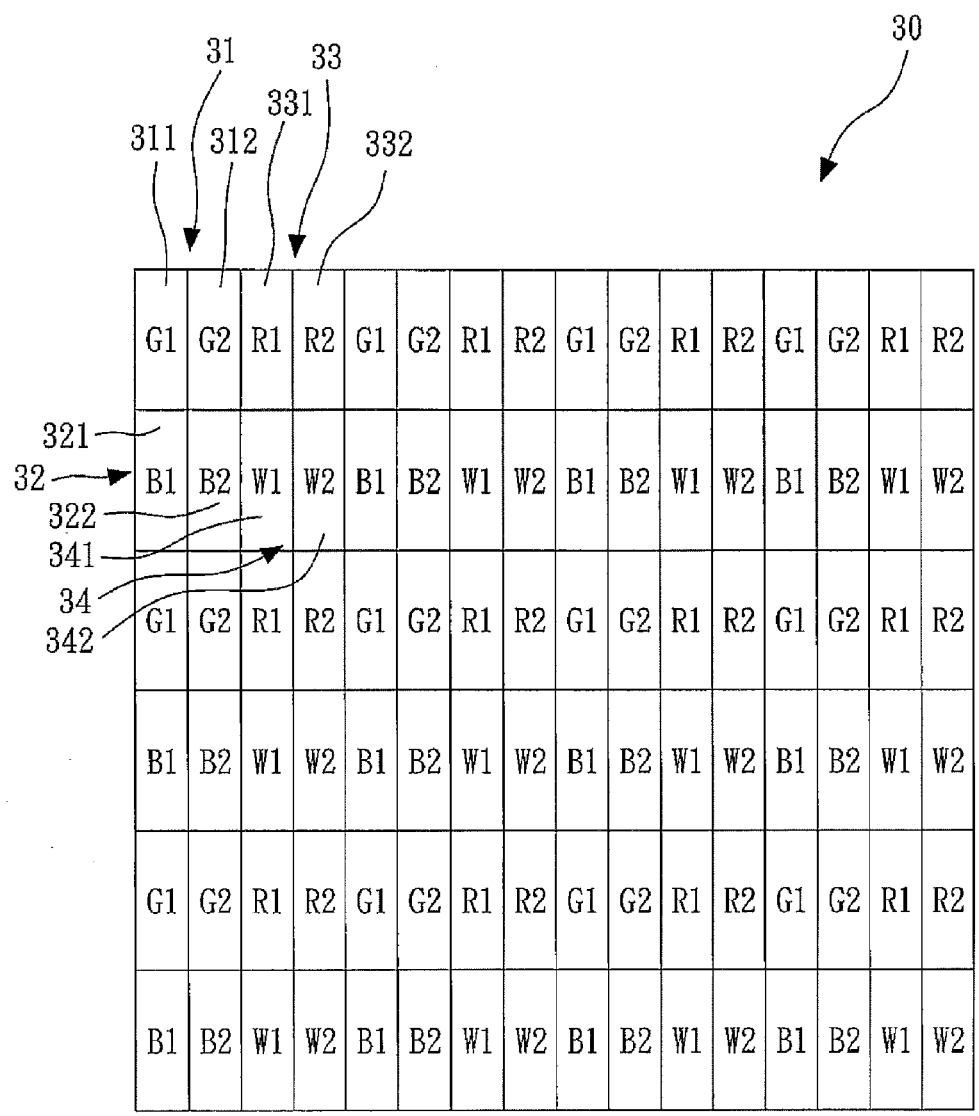
FIG. 11 shows the RGBW image device according to the second embodiment of the invention.
Figure 12A:
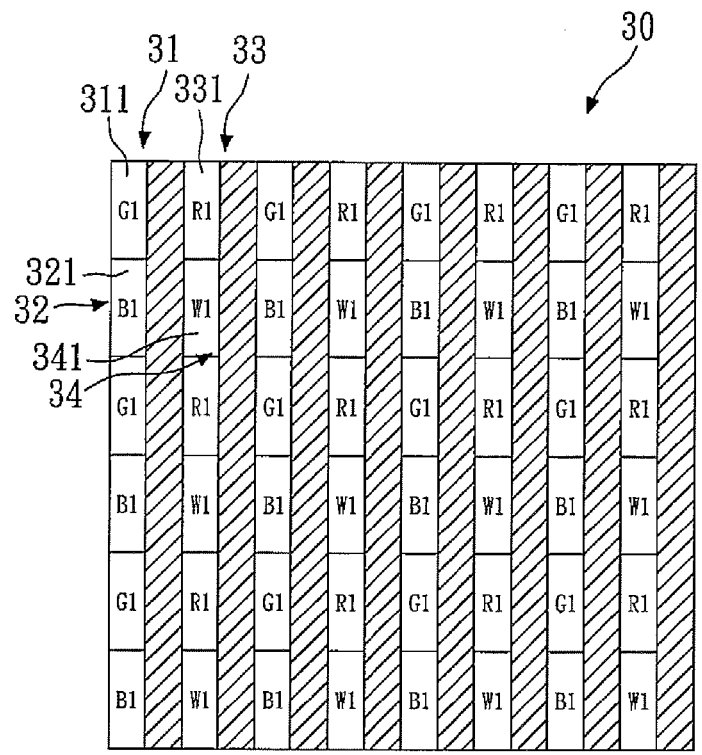
FIGS. 12A and 12B show one section of a color dot is for displaying a first image while another section of the same color dot is for displaying a second image according to the second embodiment of the invention.
Figure 12B:
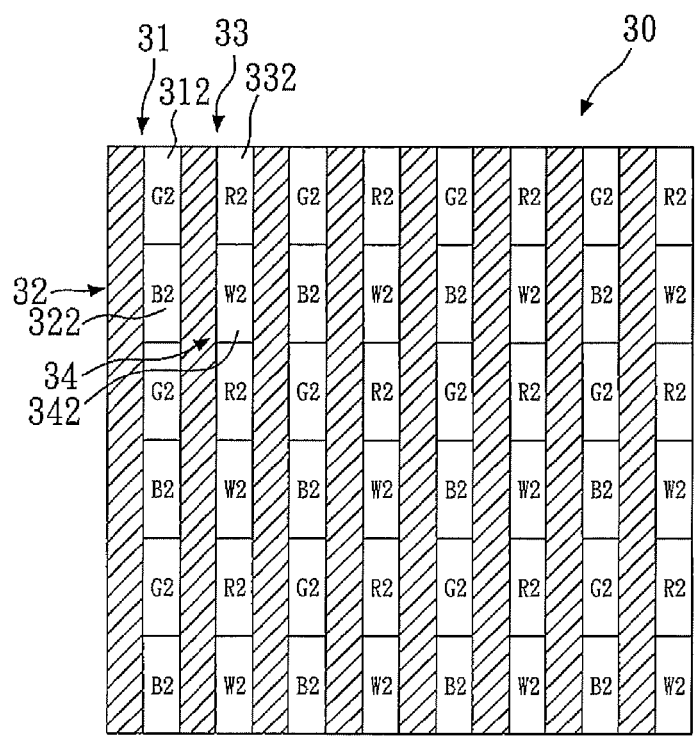

Referring to FIG. 4 again, the first color dot 31, the second color dot 32, the third color dot 33 and the fourth color dot 34 are rectangular shape. Referring to FIGS. 11, 12A and 12B, in this embodiment, the first color dot 31 is a green dot, the second color dot 32 is a blue dot, the third color dot 33 is a red dot and the fourth color dot 34 is a white dot.

Figure 6:
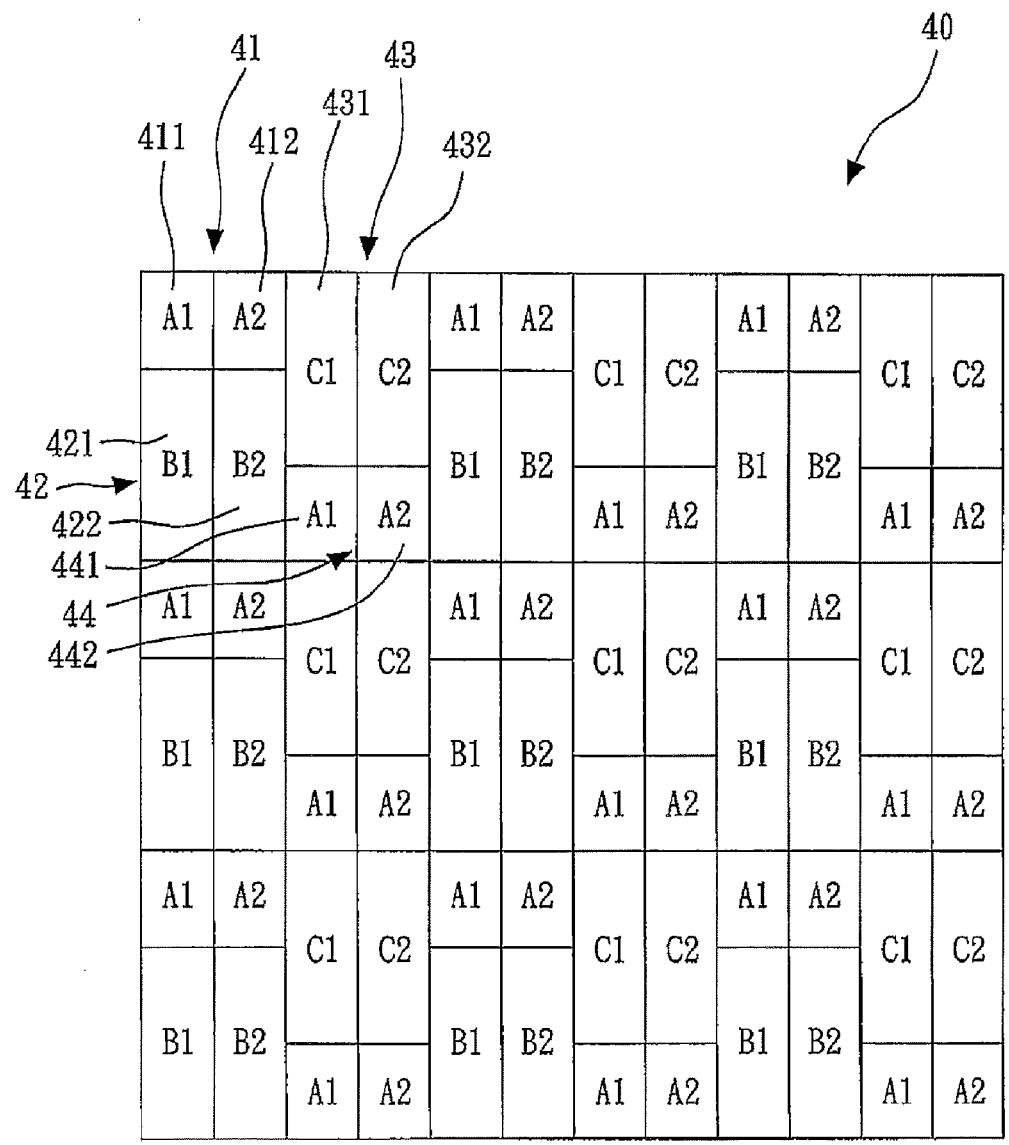
FIG. 6 shows the image device according to a third embodiment of the invention.

Referring to FIG. 6, it shows the image device according to a third embodiment of the invention. The image device 40 includes a plurality of pixel groups. Each pixel group includes a plurality of dots 41, 42, 43, 44 arranged in a predetermined identical matrix form, and each pixel group has at least one first color dot 41, at least one second color dot 42, at least one third color dot 43 and at least one fourth color dot 44. The first color dot 41 comprises at least two first color sections 411 (A1), 412 (A2) controlled independently, the second color dot 42 comprises at least two second color sections 421 (B1), 422 (B2) controlled independently, the third color dot 43 comprises at least two third color sections 431 (C1), 432 (C2) controlled independently, and the fourth color dot 44 comprises at least two fourth color sections 441 (D1), 442 (D2) controlled independently.

Figure 7A:
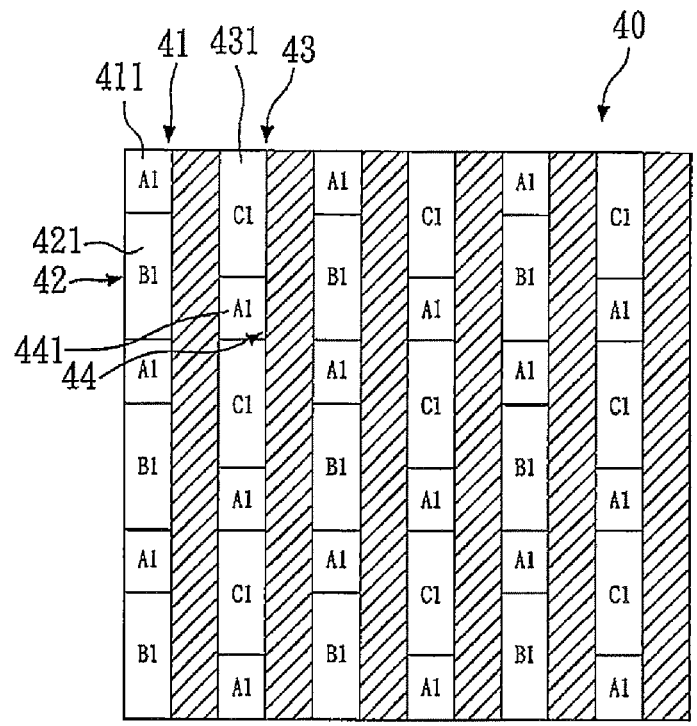
FIGS. 7A and 7B show one section of a color dot is for displaying a first image while another section of the same color dot is for displaying a second image according to the third embodiment of the invention.
Figure 7B:
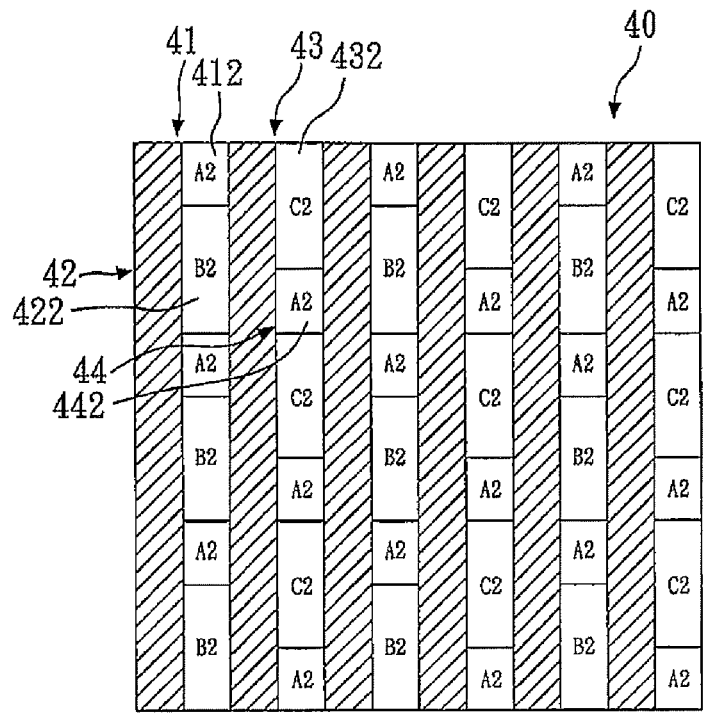

FIGS. 7A and 7B show one section of a color dot is for displaying a first image while another section of the same color dot is for displaying a second image according to the second embodiment of the invention. In FIG. 7A, one section 411(A1), 421 (B1), 431 (C1) 441 (D1) of a color dot 41, 42, 43, 44 is for displaying a first image. In FIG. 7B, another section 412(A2), 422 (B2), 432 (C2) 442 (D2) of the same color dot 41, 42, 43, 44 is for displaying a second image.

Referring to FIGS. 7A and 7B again, the first and second images may be from any video content, multimedia stream, computer output, game output, electronic device, or form any known means for sourcing video images. Further, the first and second images may be 2D and/or 3D.

Compared with FIG. 1 and FIG. 6, for example the resolution of the conventional RGB 3D display device is 1920×3×1080, the resolution of the image device 40 of the invention is 1920×2×1080. For 3D image, the resolution of the conventional RGB 3D display device for the first image is 960×3×1080, and the resolution of the conventional RGB 3D display device for the second image is 960×3×1080; the resolution of the image device 40 of the invention for the first image is 1920×1×1080, and the resolution of the image device of the invention for the second image is 1920×1×1080. For 2D image, the resolution of the conventional RGB 3D display device is 1920×3×1080, the resolution of the image device 40 of the invention is 1920×2×1080. Therefore, the image device of the invention can display a 2D image with additional one bit color depth by using the 2 sections of the same color dot. The image device of the invention can provide a thin, simple and low-cost 3D image/2D image display device which ensures seamless switching between the display of a 3D image, the display of a 2D image and the display of a mixed 2D/3D image with full resolution and high brightness.

Figure 13:
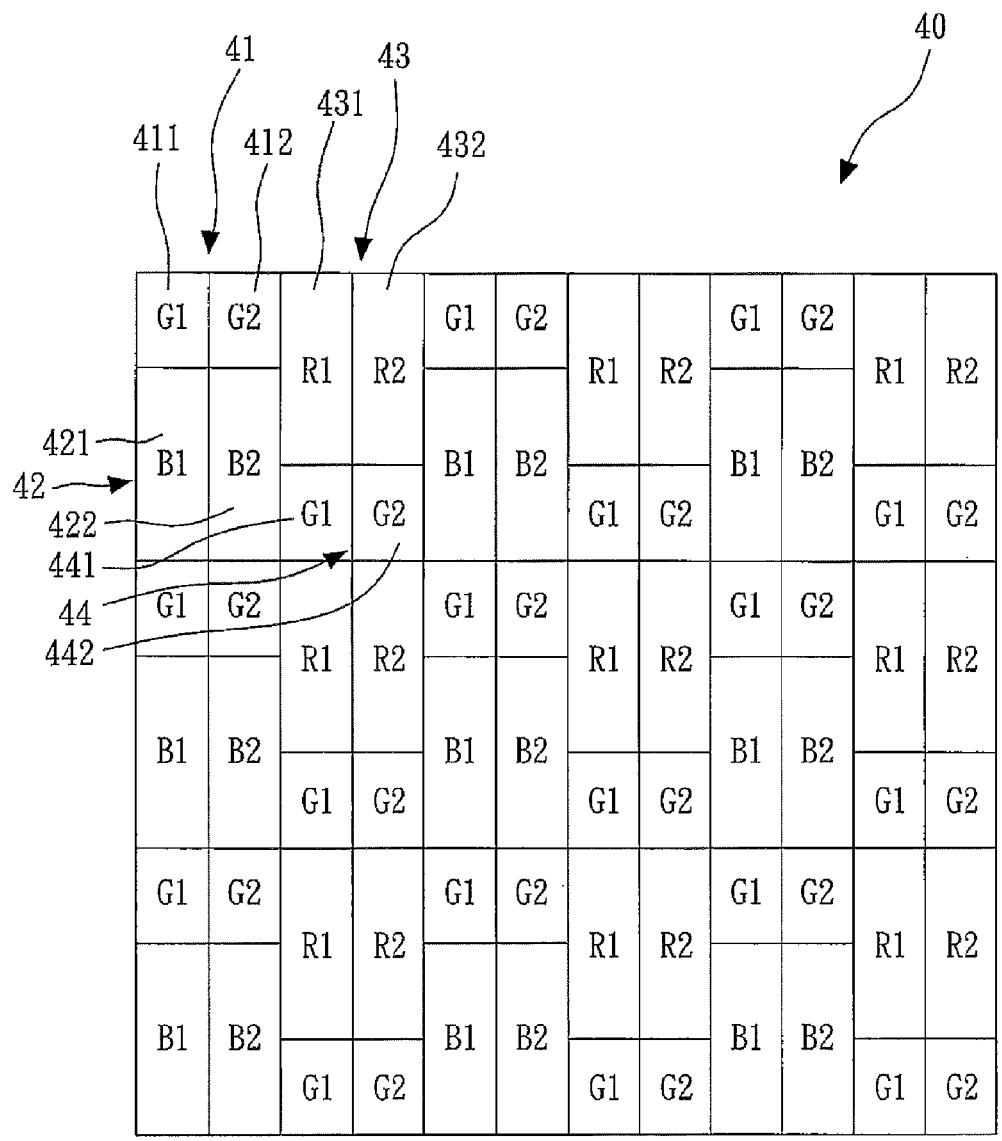
FIG. 13 shows the RGB image device according to the third embodiment of the invention.
Figure 14A:
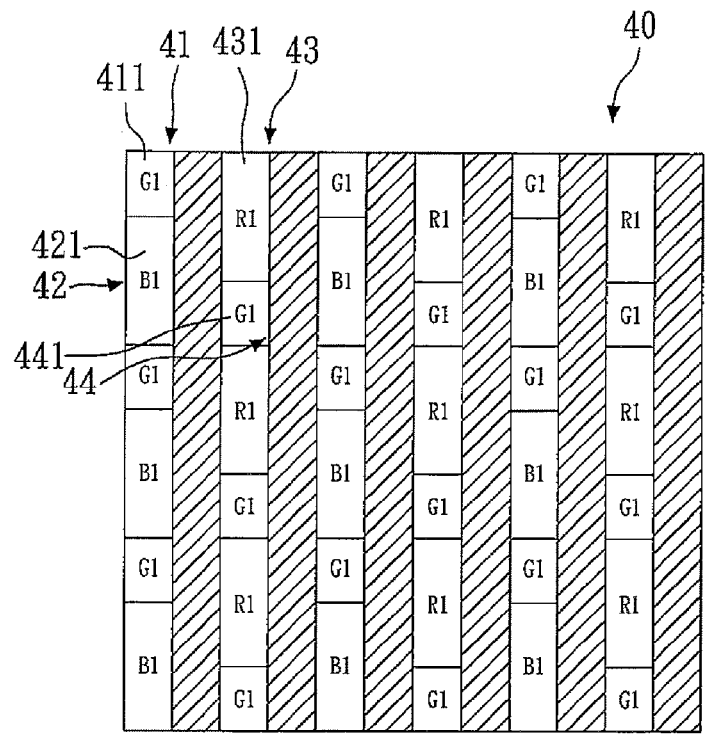
FIGS. 14A and 14B show one section of a color dot is for displaying a first image while another section of the same color dot is for displaying a second image according to the third embodiment of the invention.
Figure 14B:
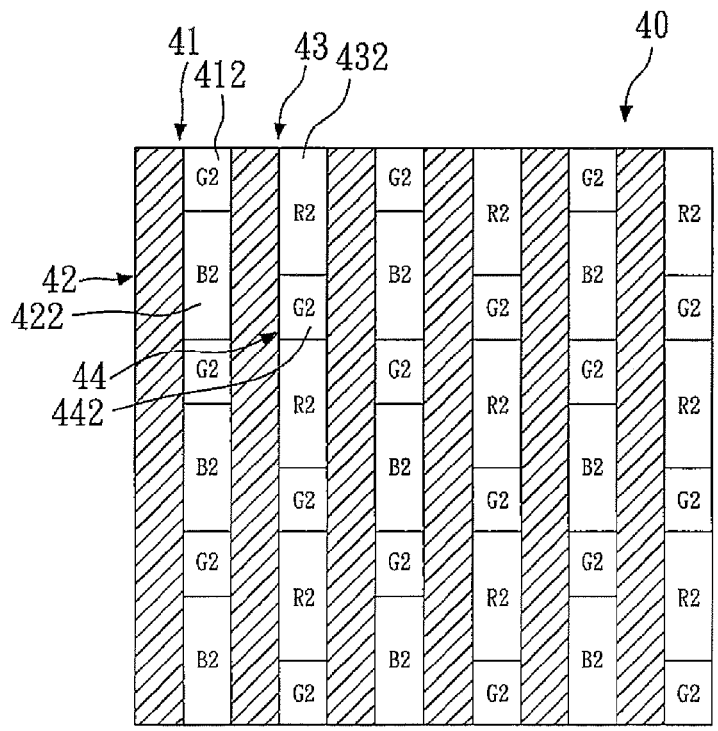

Referring to FIG. 6 again, two of the color dots are small dots 41, 44, two of the color dots are big dots 42, 43, the area of the small dot is smaller than that of the big color dot. In this embodiment, the area of the first color dot 41 is equal to that of the fourth color dot 44, the area of the third color dot 43 is equal to that of the second color dot 42, the area of the first color dot 41 is smaller than that of the third color dot 43. In this embodiment, the sum of the two areas of the two smaller color dots is equal to the area of one of the bigger color dot. The image device 40 of the invention can be used in OLED. However, it is difficult to form a white dot in OLED. Referring to FIGS. 13, 14A and 14B, in this embodiment, the first color dot 41 is a green dot, the second color dot 42 is a blue dot, the third color dot 43 is a red dot and the fourth color dot 44 is a green dot.

Figure 15:
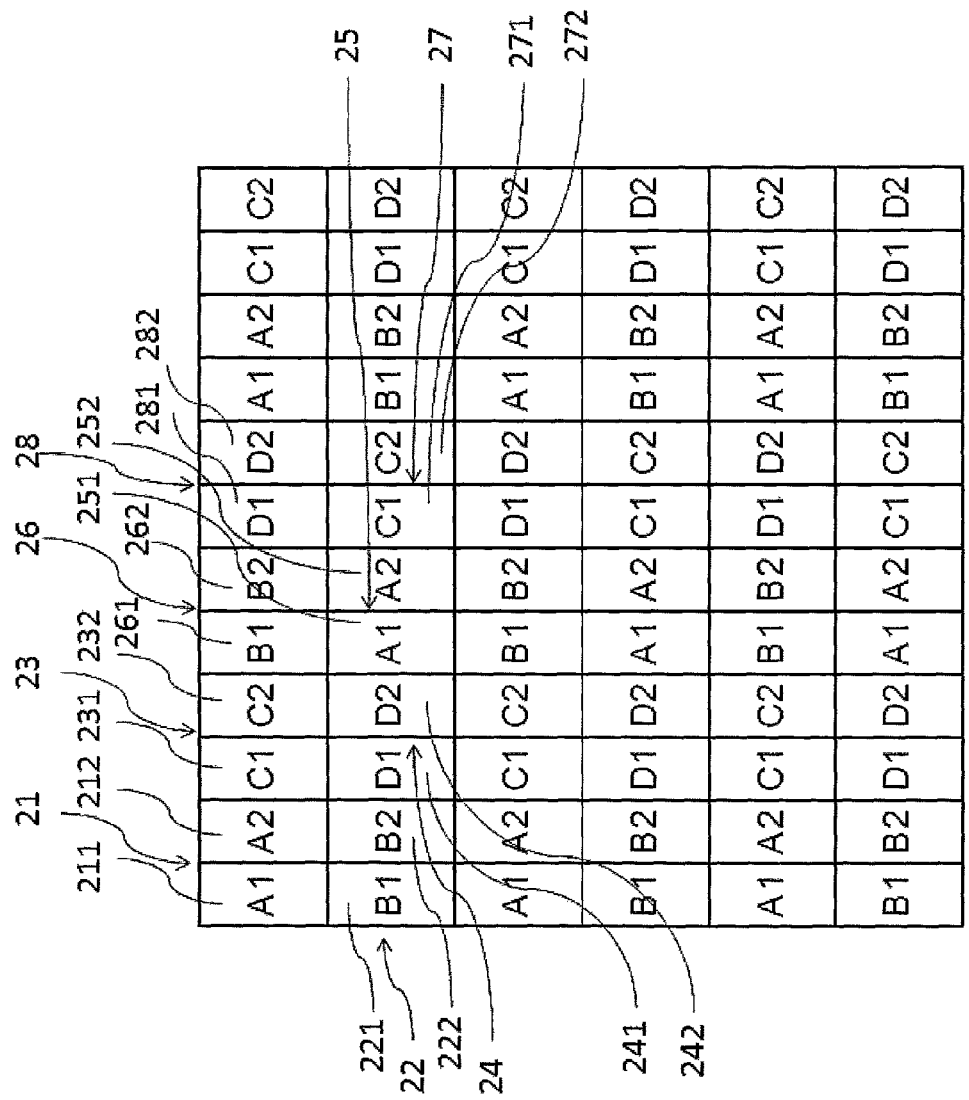
FIG. 15 shows the image device according to a fourth embodiment of the invention.

Referring to FIG. 15, it shows the image device according to a fourth embodiment of the invention. The image device 20 includes a plurality of pixel groups. Each of the first pixel groups includes a plurality of dots 21, 22, 23, 24 arranged in a predetermined identical matrix form, and each pixel group has at least one first color dot 21, at least one second color dot 22, at least one third color dot 23 and at least one fourth color dot 24. The first color dot 21 comprises at least two first color sections 211 (A1), 212 (A2) controlled independently, the second color dot 22 comprises at least two second color sections 221 (B1), 222 (B2) controlled independently, the third color dot 23 comprises at least two third color sections 231 (C1), 232 (C2) controlled independently, and the fourth color dot 24 comprises at least two fourth color sections 241 (D1), 242 (D2) controlled independently. Each of the second pixel groups includes a plurality of dots 25, 26, 27, 28 arranged in a predetermined identical matrix form, and each pixel group has at least one first color dot 25, at least one second color dot 26, at least one third color dot 27 and at least one fourth color dot 28. The first color dot 25 comprises at least two first color sections 251 (A1), 252 (A2) controlled independently, the second color dot 26 comprises at least two second color sections 261 (B1), 262 (B2) controlled independently, the third color dot 27 comprises at least two third color sections 271 (C1), 272 (C2) controlled independently, and the fourth color dot 28 comprises at least two fourth color sections 281 (D1), 282 (D2) controlled independently.

While embodiments of the present invention has been illustrated and described, various modifications and improvements can be made by those skilled in the art. The embodiments of the present invention are therefore described in an illustrative, but not restrictive, sense. It is intended that the present invention may not be limited to the particular forms as illustrated, and that all modifications which maintain the spirit and scope of the present invention are within the scope as defined in the appended claims.

What is claimed is:

1. An image device, comprising:
   a plurality of pixel groups, each of the pixel groups comprising:
   a plurality dots arranged in a predetermined identical matrix form, each of the pixel groups having at least one first color dot, at least one second color dot, at least one third color dot and at least one fourth color dot,
   wherein the first color dot comprises at least two first color sections controlled independently, and the second color dot comprises at least two second color sections controlled independently, the third color dot comprises at least two third color sections controlled independently, and the fourth color dot comprises at least two fourth color sections controlled independently,
   wherein depending on an orientation of the image display with respect to a viewer, one of the at least two first color sections of each of the pixel groups is located directly between another of the at least two first color sections and one of the at least two third color sections, in a row direction or a column direction and
   the data inputted to one of the at least two color sections of each color dot is multiprimary color signals for a first group of viewers, and the data inputted to another one of the at least two color sections of each color dot is multiprimary color signals for a second group of viewers.

2. The image device according to claim 1, further comprising an optical unit disposed at one side of the image device and having view-separation elements arranged in the first direction into multiple rows and columns.

3. The image device according to claim 2, wherein the optical unit is a liquid crystal shutter.

4. The image device according to claim 2, wherein the optical unit is a lenticular lens.

5. The image device according to claim 2, wherein the optical unit is a parallax barrier.

6. The image device according to claim 1, further comprising a first sub-pixel rendering and color space converting device for receiving input data for a first image in a first color space and outputting multi-primary color section signals for the first image in a second color space.

7. The image device according to claim 6, further comprising a second sub-pixel rendering and color space converting device for receiving input data for a second image in the first color space and outputting multi-primary color section signals for the second image in the second color space.

8. The image device according to claim 1, wherein the two first color sections are arranged in a first direction, the two second color sections are arranged in the first direction, the two third color sections are arranged in the first direction, the two fourth color sections are arranged in the first direction.

9. The image device according to claim 1, wherein the two first color sections are arranged in a second direction, the two second color sections are arranged in the second direction, the two third color sections are arranged in the second direction, the two fourth color sections are arranged in the second direction.

10. The image device according to claim 1, wherein each of the color dots represents a luminance and a chrominance of a corresponding full color pixel data by grouping with neighboring dots to form a plurality of overlapping full color dynamic pixel groups.

11. The image device according to claim 1, wherein the second color dot and the third color dot have lower light intensity than the first color dot and the fourth color dot in a white balance status, and
    the first color dot and the fourth color dot are disposed on diagonal positions of the predetermined identical matrix in each of the pixel groups.

12. The image device according to claim 11, wherein the first color dot, the second color dot, the third color dot and the fourth color dot are quadrate shaped.

13. The image device according to claim 11, wherein the first color dot, the second color dot, the third color dot and the fourth color dot are rectangular shaped.

14. The image device according to claim 11, wherein the first color dot is a green dot, the second color dot is a blue dot, the third color dot is a red dot and the fourth color dot is a white dot.

15. The image device according to claim 11, wherein two of the color dots are small color dots, two of the color dots are big color dots, so that an area of each of the two small color dots is smaller than that of each of the two big color dots.

16. The image device according to claim 15, wherein the area of the first color dot is equal to that of the fourth color dot, the area of the third color dot is equal to that of the second color dot, and
    the area of the first color dot is smaller than that of the third color dot.

17. The image device according to claim 16, wherein a sum of the two areas of the two small color dots is equal to the area of one of the big color dots.

18. The image device according to claim 17, wherein the first color dot is a green dot, the second color dot is a blue dot, the third color dot is a red dot and the fourth color dot is a green dot.

19. A method for controlling the image device as claimed in claim 1, comprising the steps of:
  (a) first sub-pixel rendering and color space converting the input data for a first image in a first color space, and outputting multi-primary color section signals for the first image in the second color space; and
  (b) second sub-pixel rendering and color space converting the input data for a second image in the first color space and outputting multi-primary color section signals for the second image in the second color space.

20. An image device, comprising:
  a plurality of pixel groups, each of the pixel groups comprising:
  a plurality dots arranged in a predetermined identical matrix form, each of the pixel groups having at least one first color dot, at least one second color dot, at least one third color dot and at least one fourth color dot,
  wherein the first color dot comprises at least two first color sections controlled independently, and the second color dot comprises at least two second color sections controlled independently, the third color dot comprises at least two third color sections controlled independently, and the fourth color dot comprises at least two fourth color sections controlled independently,
  wherein depending on an orientation of the image display with respect to a viewer, one of the at least two first color sections of each of the pixel groups is located directly between another of the at least two first color sections and one of the at least two third color sections, and
  the first color dot and the second color dot in first pixel groups and the first color dot and the second color dot in second pixel groups are arranged alternately, in a row direction or a column direction.

21. The image device according to claim 20,
  wherein depending on an orientation of the image display with respect to a viewer, the third color dot and the fourth color dot in first pixel groups and the third color dot and the fourth color dot in second pixel groups are arranged alternately, in a row direction or a column direction.

* * * * *